(12) United States Patent
Sakhnini et al.

(10) Patent No.: US 11,765,757 B2
(45) Date of Patent: Sep. 19, 2023

(54) DYNAMIC REALLOCATION OF PERIODIC OCCASIONS FOR WIRELESS COMMUNICATIONS

(71) Applicant: QUALCOMM Incorporated, San Diego, CA (US)

(72) Inventors: Iyab Issam Sakhnini, San Diego, CA (US); Olufunmilola Omolade Awoniyi-Oteri, San Diego, CA (US); Tao Luo, San Diego, CA (US); Wanshi Chen, San Diego, CA (US); Qiang Wu, San Diego, CA (US); Junyi Li, Franklin Park, NJ (US); Peter Gaal, San Diego, CA (US); Juan Montojo, San Diego, CA (US); Jelena Damnjanovic, Del Mar, CA (US); Mahmoud Taherzadeh Boroujeni, San Diego, CA (US); Yan Zhou, San Diego, CA (US); Wooseok Nam, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 17/185,101

(22) Filed: Feb. 25, 2021

(65) Prior Publication Data
US 2021/0352684 A1    Nov. 11, 2021

Related U.S. Application Data

(60) Provisional application No. 63/022,426, filed on May 8, 2020.

(51) Int. Cl.
*H04W 72/50*    (2023.01)
*H04W 72/1273*    (2023.01)
(Continued)

(52) U.S. Cl.
CPC ......... *H04W 72/535* (2023.01); *H04L 1/1819* (2013.01); *H04W 72/0446* (2013.01);
(Continued)

(58) Field of Classification Search
CPC ......... H04W 72/1257; H04W 72/0446; H04W 72/0453; H04W 72/1273; H04W 72/14; H04L 1/1819
See application file for complete search history.

(56) References Cited

U.S. PATENT DOCUMENTS

2018/0288746 A1 * 10/2018 Zhang ................. H04L 1/0031
2018/0324768 A1 * 11/2018 Shaheen .............. H04L 5/0053
(Continued)

OTHER PUBLICATIONS

ASUSTEK: "Clarification on SPS and GF Reconfiguration", 3GPP Draft, R2-1809500, 3GPP TSG-RAN WG2 Meeting AH-1807, Clarification on SPS and GF Reconfiguration, 3rd Generation Partnership Project (3GPP), Mobile Competence Centre, 650, Route Des Lucioles, F-06921 Sophia-Antipolis Cedex, Fra, vol. RAN WG2, No. Montreal, Canada, Jul. 2, 2018-Jul. 6, 2018, Jul. 1, 2018 (Jul. 1, 2018), XP051466788, 5 Pages, Retrieved from the Internet: URL: http://www.3gpp.org/ftp/Meetings%5F3GPP%5FSYNC/RAN2/ DocS [retrieved on Aug. 9, 2018] Sections 1-3 Section 5.
(Continued)

*Primary Examiner* — Jael M Ulysse
(74) *Attorney, Agent, or Firm* — Patterson + Sheridan, LLP

(57) ABSTRACT

Aspects of the present disclosure relate to wireless communications, and more particularly, to mechanisms for activating semi-static or periodic occasions for communications.

28 Claims, 14 Drawing Sheets

(51) Int. Cl.
*H04L 1/1812* (2023.01)
*H04W 72/0453* (2023.01)
*H04W 72/0446* (2023.01)
*H04W 72/23* (2023.01)

(52) U.S. Cl.
CPC ... *H04W 72/0453* (2013.01); *H04W 72/1273* (2013.01); *H04W 72/23* (2023.01)

(56) References Cited

U.S. PATENT DOCUMENTS

| | | | | |
|---|---|---|---|---|
| 2019/0327760 | A1* | 10/2019 | Holfeld | H04W 72/23 |
| 2020/0146034 | A1* | 5/2020 | Bagheri | H04W 72/1268 |
| 2021/0105812 | A1* | 4/2021 | Rastegardoost | H04L 1/08 |
| 2021/0160879 | A1* | 5/2021 | Lin | H04L 1/0003 |
| 2021/0168783 | A1* | 6/2021 | Islam | H04W 72/23 |
| 2021/0282137 | A1* | 9/2021 | Wang | H04W 72/23 |
| 2022/0210823 | A1* | 6/2022 | Alfarhan | H04L 1/1887 |

OTHER PUBLICATIONS

Ericsson: "On MAC Impacts for Multiple SPS and CG", 3GPP Draft, R2-1906839, 3GPP TSG-RAN WG2 #106, On MAC Impacts for Multiple SPS and CG, 3rd Generation Partnership Project (3GPP), Mobile Competence Centre, 650, Route Des Lucioles, F-06921 Sophia-Antipolis Cedex, France vol. RAN WG2, No. Reno, US, May 13, 2019-May 17, 2019, May 13, 2019 (May 13, 2019), XP051730291, 4 Pages, Retrieved from the Internet: URL:http://www.3gpp.org/ftp/Meetings%5F3GPP%5FSYNC/RAN2/Docs/R2%2D1906839%2Ezip [retrieved on May 14, 2019] Sections 1-3.
International Search Report and Written Opinion—PCT/US2021/020011—ISA/EPO—dated Jun. 15, 2021.

* cited by examiner

DYNAMIC REALLOCATION OF PERIODIC OCCASIONS FOR WIRELESS COMMUNICATIONS

CROSS REFERENCE TO RELATED APPLICATION

This application hereby claims priority under 35 U.S.C. § 119 to pending U.S. Provisional Patent Application No. 63/022,426, filed on May 8, 2020, the contents of which are incorporated herein in their entirety.

TECHNICAL FIELD

Aspects of the present disclosure relate to wireless communications, and more particularly, to mechanisms for dynamically re-allocating periodic occasions for wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to mechanisms for activating semi-static or periodic occasions for uplink or downlink communication.

Certain aspects of the present disclosure provide a method for wireless communications by a UE. The method generally includes receiving at least one configuration allocating the UE with a set of periodic occasions for communications, receiving signaling dynamically re-allocating one or more of the occasions, and at least one of monitoring for downlink transmissions or sending uplink transmissions in one or more of the re-allocated occasions.

Certain aspects of the present disclosure provide a method for wireless communications by a network entity. The method generally includes sending, to a user equipment (UE), at least one configuration allocating the UE with a set of periodic occasions for communications, sending signaling to the UE dynamically re-allocating one or more of the occasions, and at least one of monitoring for uplink transmissions or sending downlink transmissions in one or more of the re-allocated occasions.

Certain aspects of the present disclosure provide a user equipment (UE). The UE generally includes means for receiving at least one configuration allocating the UE with a set of periodic occasions for communications, means for receiving signaling dynamically re-allocating one or more of the occasions, and at least one of means for monitoring for downlink transmissions or means for sending uplink transmissions in one or more of the re-allocated occasions.

Certain aspects of the present disclosure provide a network entity. The network entity generally includes means for sending, to a user equipment (UE), at least one configuration allocating the UE with a set of periodic occasions for communications, means for sending signaling to the UE dynamically re-allocating one or more of the occasions, and at least one of means for monitoring for uplink transmissions or means for sending downlink transmissions in one or more of the re-allocated occasions.

Certain aspects of the present disclosure provide a user equipment (UE). The UE generally includes a receiver configured to receive at least one configuration allocating the UE with a set of periodic occasions for communications and signaling dynamically re-allocating one or more of the occasions, and a processing system configured to at least one of monitor for downlink transmissions or provide uplink transmissions, for transmission, in one or more of the re-allocated occasions.

Certain aspects of the present disclosure provide a network entity. The network entity generally includes a transmitter configured to send, to a user equipment (UE), at least one configuration allocating the UE with a set of periodic occasions for communications and send signaling to the UE dynamically re-allocating one or more of the occasions, and a processing system configured to at least one of monitor for uplink transmissions or provide downlink transmissions, for transmission, in one or more of the re-allocated occasions.

Certain aspects of the present disclosure provide an apparatus for wireless communications by a user equipment (UE). The apparatus generally includes a processing system configured to obtain at least one configuration allocating the UE with a set of periodic occasions for communications, obtain signaling dynamically re-allocating one or more of the occasions, and at least one of monitor for downlink transmissions or provide uplink transmissions, for transmission, in one or more of the re-allocated occasions.

Certain aspects of the present disclosure provide an apparatus for wireless communications by a network entity. The apparatus generally includes a processing system configured to provide, for transmission to a user equipment (UE), at least one configuration allocating the UE with a set of periodic occasions for communications, provide, for transmission to the UE, signaling dynamically re-allocating one or more of the occasions, and at least one of monitor for uplink transmissions or provide downlink transmissions, for transmission, in one or more of the re-allocated occasions.

Certain aspects of the present disclosure provide a computer-readable medium for wireless communications by a UE. The computer-readable medium generally includes instructions executable to receive at least one configuration allocating the UE with a set of periodic occasions for communications, receive signaling dynamically re-allocating one or more of the occasions, and at least one of monitor for downlink transmissions or send uplink transmissions in one or more of the re-allocated occasions.

Certain aspects of the present disclosure provide a computer-readable medium for wireless communications by a network entity. The computer-readable medium generally includes instructions executable to send, to a user equipment (UE), at least one configuration allocating the UE with a set of periodic occasions for communications, send signaling to the UE dynamically re-allocating one or more of the occasions, and at least one of monitor for uplink transmissions or send downlink transmissions in one or more of the re-allocated occasions.

Aspects generally include network entities, UEs, methods, apparatuses, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
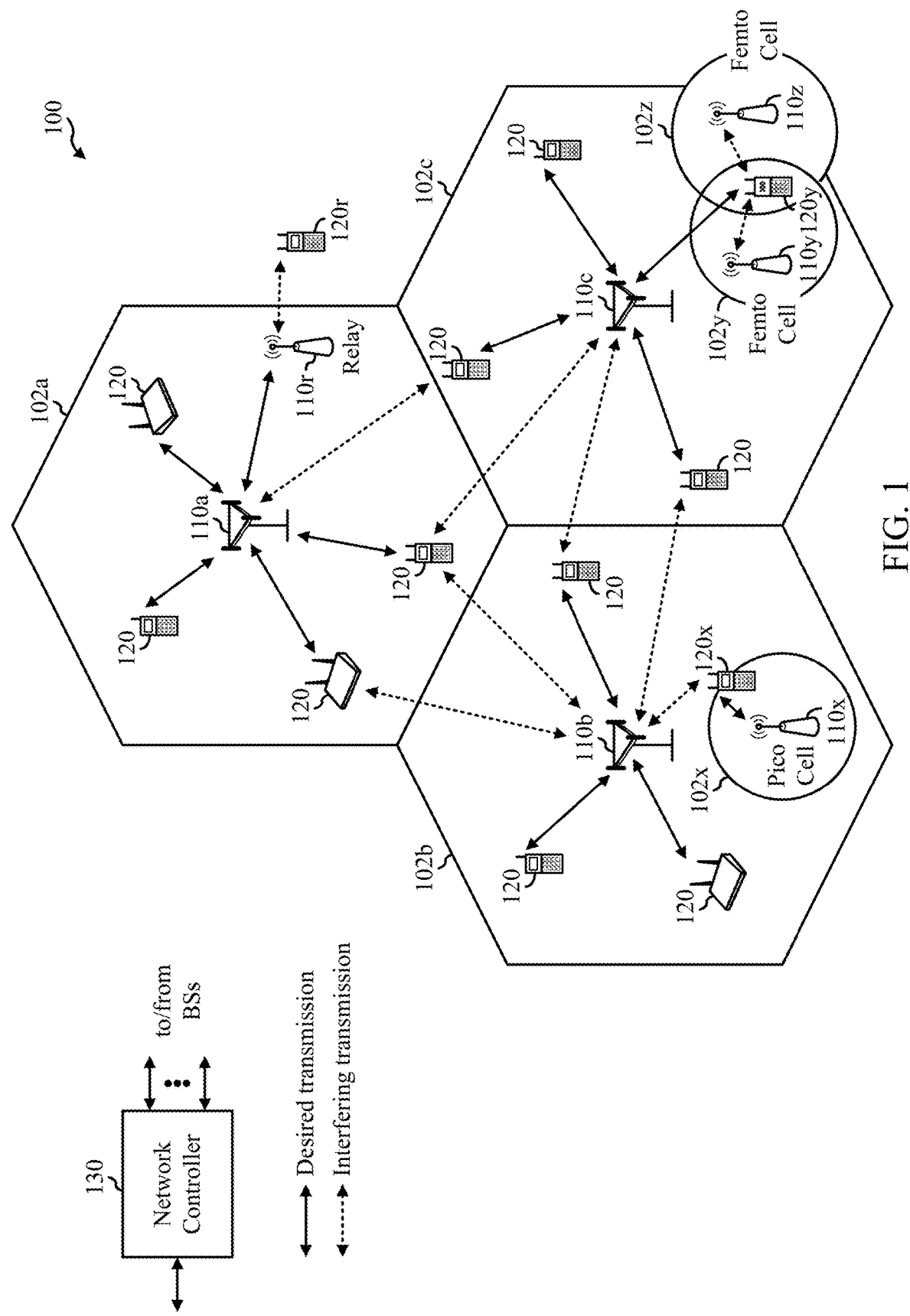
FIG. 1 is a block diagram conceptually illustrating an example telecommunications system, in accordance with certain aspects of the present disclosure.

Aspects of the present disclosure relate to wireless communications, and more particularly, to mechanisms for dynamically re-allocating periodic occasions for wireless communications, such as semi persistently scheduled (SPS) occasions for downlink transmissions and/or configured grants (CGs) for uplink transmissions.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless System

FIG. 1 illustrates an example wireless network 100 in which aspects of the present disclosure may be performed. For example, one or more UEs 120 of the wireless network 100 may be configured to perform operations 800 of FIG. 8 to receive and process signaling to dynamically re-allocate periodic occasions for wireless communications. Similarly, a base station 110 of the wireless network 100 may be configured to perform operations 900 of FIG. 9 to send such signaling to a UE 120 (performing operations 800 of FIG. 8).

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
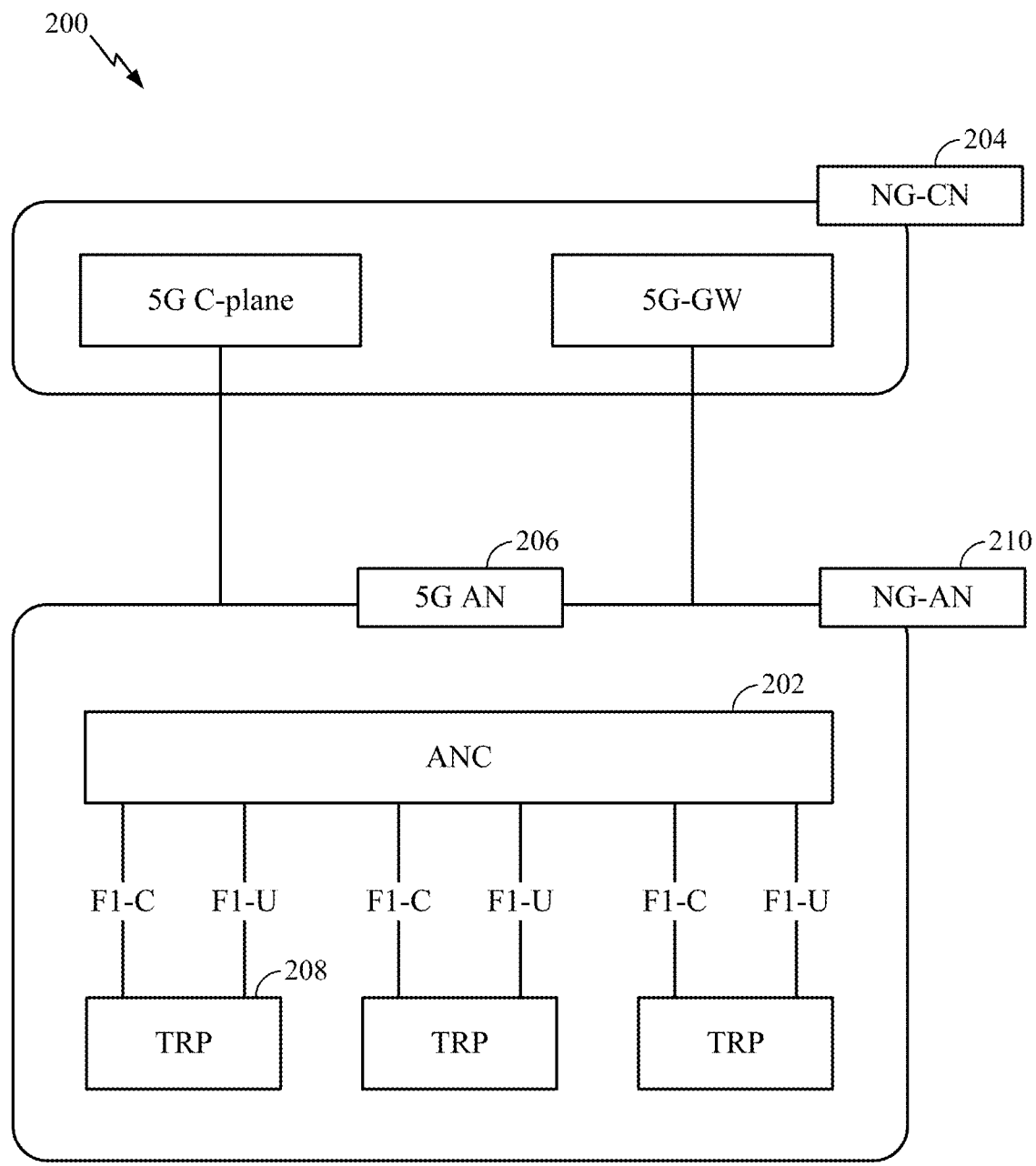
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
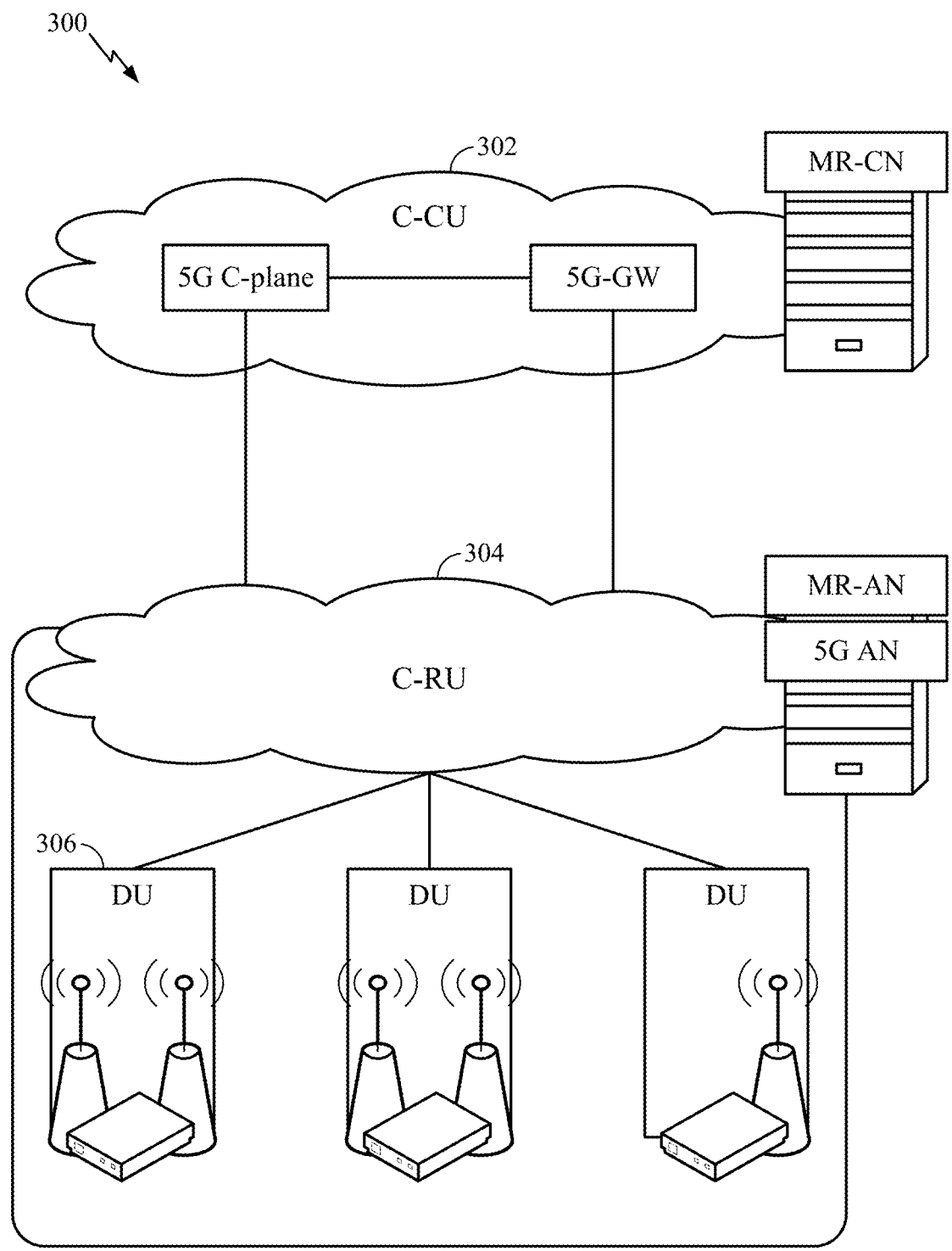
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
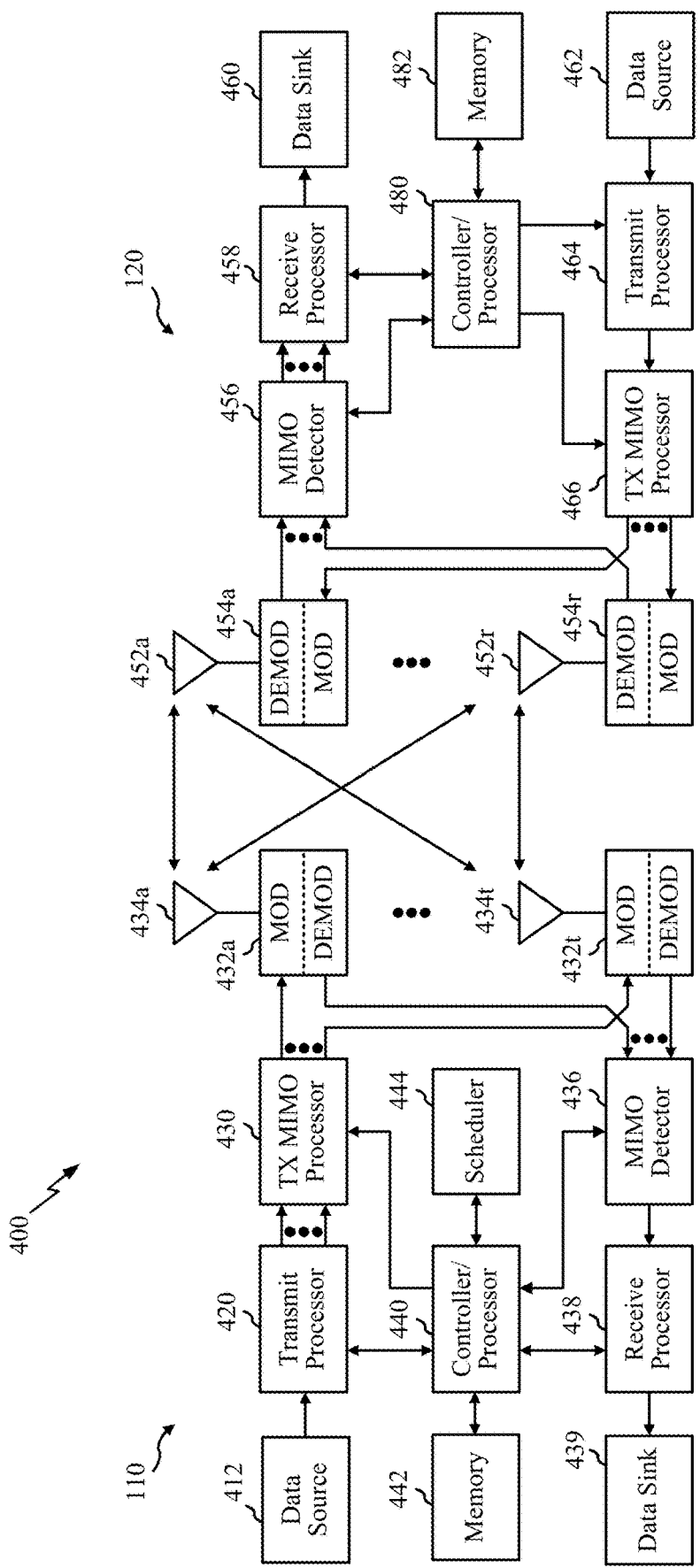
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

Figure 8:
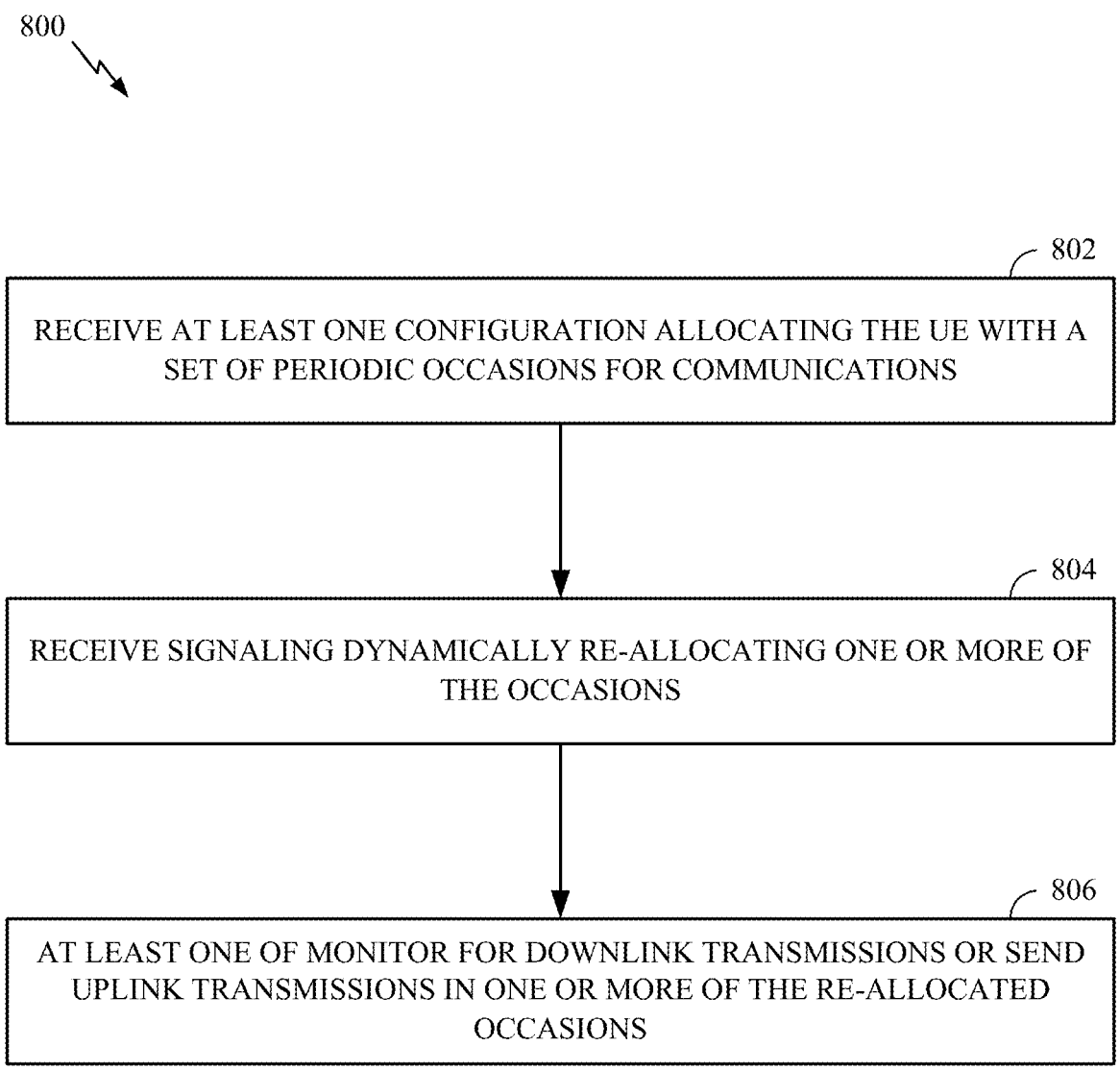
FIG. 8 illustrates example operations that may be performed by a user equipment (UE), in accordance with aspects of the present disclosure.

As an example, one or more of the antennas 452, DEMOD/MOD 454, processors 466, 458, 464, and/or controller/processor 480 of the UE 120 may be configured to perform operations 800 of FIG. 8. Similarly, one or more of the 434, DEMOD/MOD 432, processors 430, 420, 438 and/or controller/processor 440 of the BS 110 may be configured to perform the operations described herein (e.g., operations 900 of FIG. 9).

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8 and/or other processes for the techniques described herein and those illustrated in the appended drawings. The processor 440 and/or other processors and modules at the BS 110 may perform or direct processes for the techniques described with reference to FIG. 9 and/or other processes for the techniques described herein and those illustrated in the appended drawings. The memories 442 and 482 may store data and program codes for the BS 110 and the UE 120, respectively.

Figure 5:
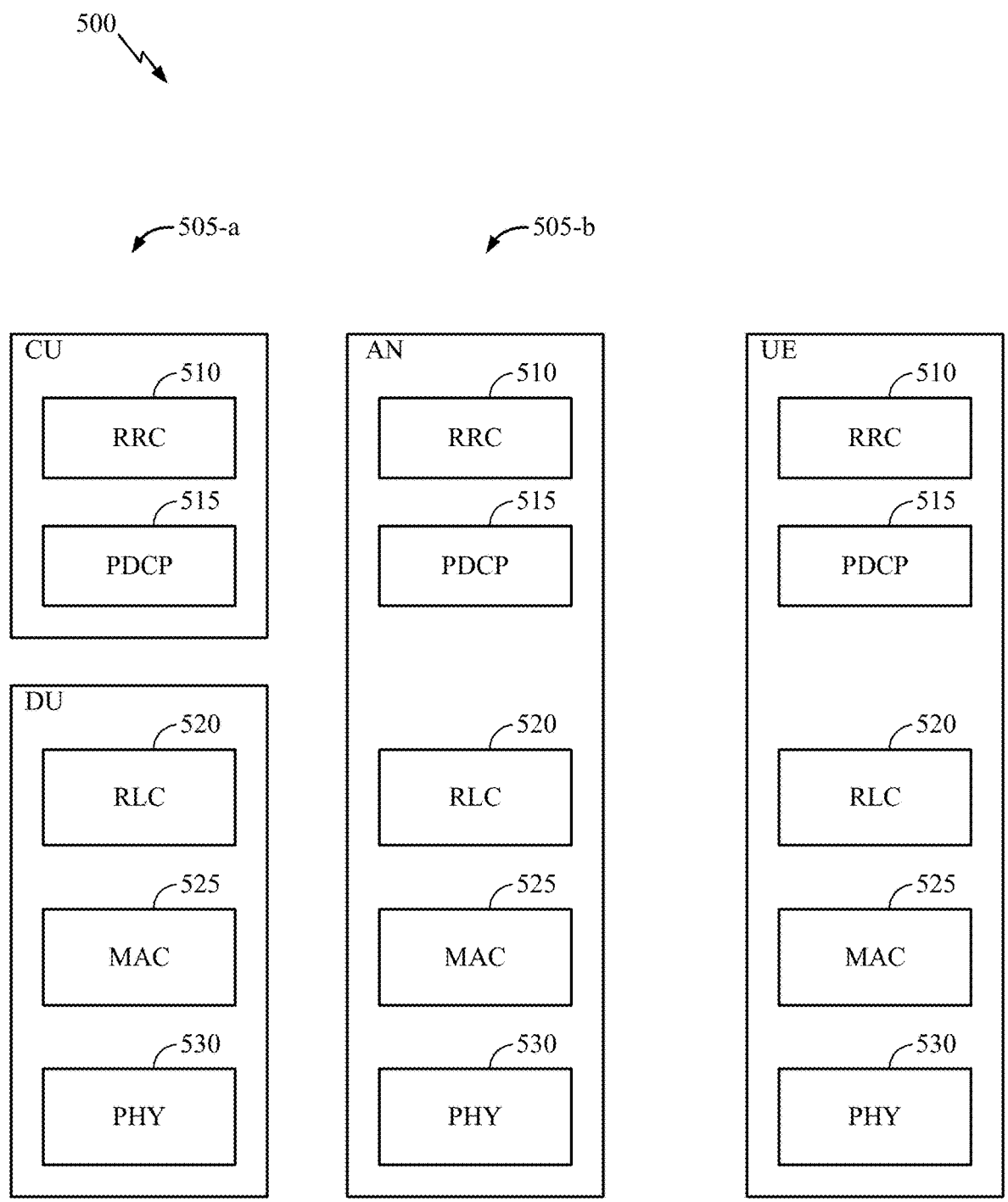
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
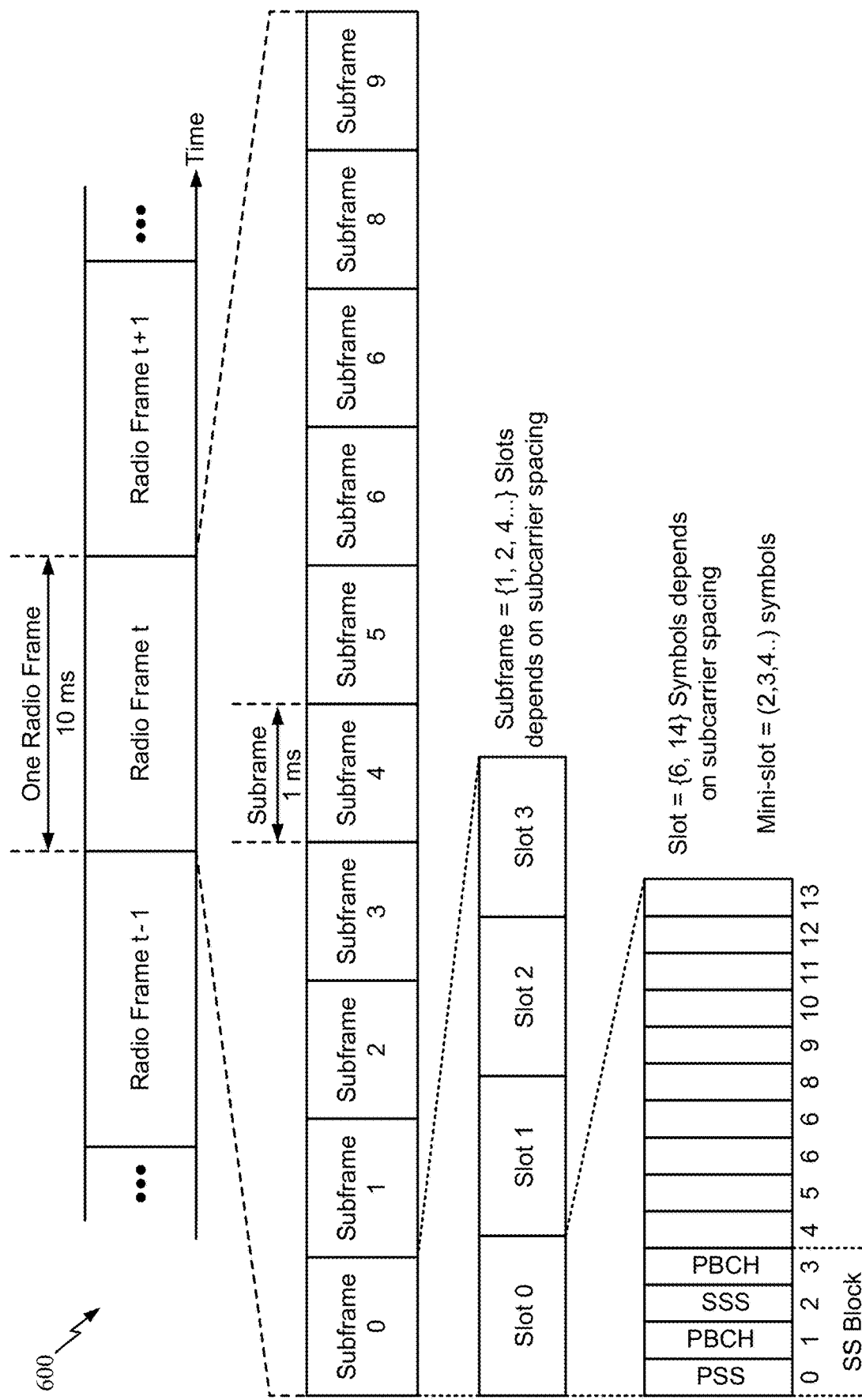
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Dynamic Reallocation of SPS/CG Occasions

Aspects of the present disclosure relate to wireless communications, and more particularly, to mechanisms for dynamically re-allocating periodic occasions for wireless communications, such as semi persistently scheduled (SPS) occasions for downlink transmissions and/or configured grants (CGs) for uplink transmissions.

SPS resource allocation, which is sometimes called configured downlink assignment, refers to a scheduling technique where a user-equipment (UE) is pre-configured by the network/base station (e.g., eNBs, gNB, etc.) with a periodicity and an offset.

Figure 7:
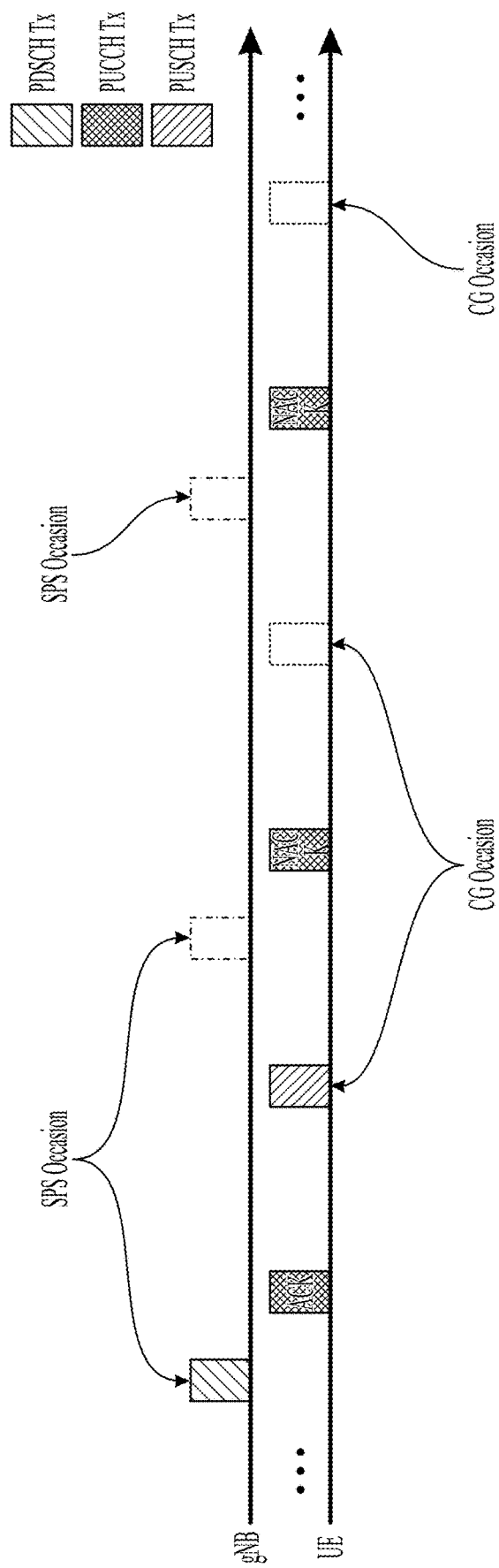
FIG. 7 illustrates an example of semi-persistent scheduled (SPS) PDSCH occasions that may be used to activate configured grant (CG) occasions.

As illustrated in FIG. 7, once pre-configured, if the UE were to receive an allocation of downlink resources, then the allocation of SPS occasions would repeat according to the pre-configured periodicity, resulting in periodic SPS occasions. For SPS, the base station may use Radio Resource Control (RRC) signaling to define the periodicity of configured downlink assignments. Similarly, once configured with CG occasions, the allocation of CG occasions may repeat according to the pre-configured periodicity.

As used herein, the term occasion generally refers to a time in which resource are allocated for a transmission that may or may not ultimately happen. For example, a downlink transmission may or may not occur in an SPS occasions. Similarly, an uplink transmission may or may not occur in a CG occasion. Occasions may be considered activated if the transmission may occur and, thus, those occasions should be monitored.

In current systems, CGs are semi-statically activated either by radio resource control (RRC) or downlink control information (DCI) signaling. In some cases, an UL data packet in a CG occasion may be triggered by a decoded DL data packet in an SPS occasion (e.g., to report action status in response to new input/command from DL). This type of activation mechanism, however, may result in a waste of resources.

For example, as illustrated in FIG. 7, if DL data in an SPS is missed, the UE may still assume that every CG occasion is available for any UL traffic, even though the UL traffic may be low priority and delay insensitive. Therefore, the gNB may need to reserve all CG occasions for the UE, even if no DL data is sent to solicit urgent response via UL data transmission.

Semi-persistent scheduling (SPS) and configured grants (CG) are resource efficient ways to schedule DL and UL data, respectively, where DL and UL resources are pre-configured with a certain periodicity and offsets The network may or may not send data on the configured SPS occasions but in either case the UE has to attempt to decode the PDSCH at these preconfigured SPS occasions. If no data is received by the UE in an SPS occasion, the UE sends a HARQ NACK corresponding to this occasion As noted above, the UE may utilize CG occasions to send UL data. In some cases, a timer (configuredGrantTimer) is configured via RRC (in multiples of periodicity) where it is (re)started on the $1^{st}$ transmission on a HARQ process. In general, the timer is used to prevent the UE from sending new data on this HARQ process until the timer expires.

Retransmissions for SPS and CG occasions are usually done using dynamic grants. HARQ process IDs for SPS and CG occasions are derived using equations (e.g., defined in TS 38.321) as follows, for SPS occasions:

HARQ Process ID=[floor(CURRENT_slot×10/(numberOfSlotsPerFrame×periodicity))] modulo nrof-HARQ-Processes, and for CG occasions:

HARQ Process ID=[floor(CURRENT_symbol/periodicity)] modulo nrofHARQ-Processes, where the variables are defined in the standard specification documents.

In some systems, especially with reduced capability NR devices, there may be large number of UEs that are configured with SPS or CG resources. Given the periodicity of these SPS or CG resources, it may reduce the flexibility of the network to accommodate/multiplex other UEs with high (urgent) data, since SPS/CG occasions may already be pre-occupied/pre-configured to some other UE.

In general, the network may always choose to frequency division multiplex (FDM) or use MU-MIMO to multiplex these UEs (UEs using SPS/CG and UEs with high priority messages). However, this may not always be possible, especially if the 2 UEs are using gNB Tx or Rx (in case of SPS or CG, respectively) beams pointing in different directions.

Therefore, to accommodate the high priority UE that needs to communicate on another UE's SPS or CG occasion, the network may choose to repoint its beam to this high priority UE and communicate. However, if the network does not inform the SPS or CG UE, that UE will attempt to decode, only to fail and then send a NACK (in case of SPS) or send data and then retransmit (in the case of CG). In either case, this will waste resources and UE power.

Aspects of the present disclosure, however, provide efficient and flexible mechanisms for dynamically re-allocating SPS and/or CG occasions, which may help avoid this resource waste and may help conserve UE power.

FIG. 8 illustrates example operations 800 for wireless communications by a UE. Operations 800 may be performed, for example, by a UE 120 (e.g., UE 120) participating in communications with a base station (e.g., a gNB dynamically re-allocating SPS/CG occasions according to operations 900 of FIG. 9).

Operations 800 begin, at 802, by receiving at least one configuration allocating the UE with a set of periodic occasions for communications.

At 804, the UE receives signaling dynamically re-allocating one or more of the occasions.

At 806, the UE performs at least one of monitoring for downlink transmissions or sending uplink transmissions in one or more of the re-allocated occasions.

Figure 9:
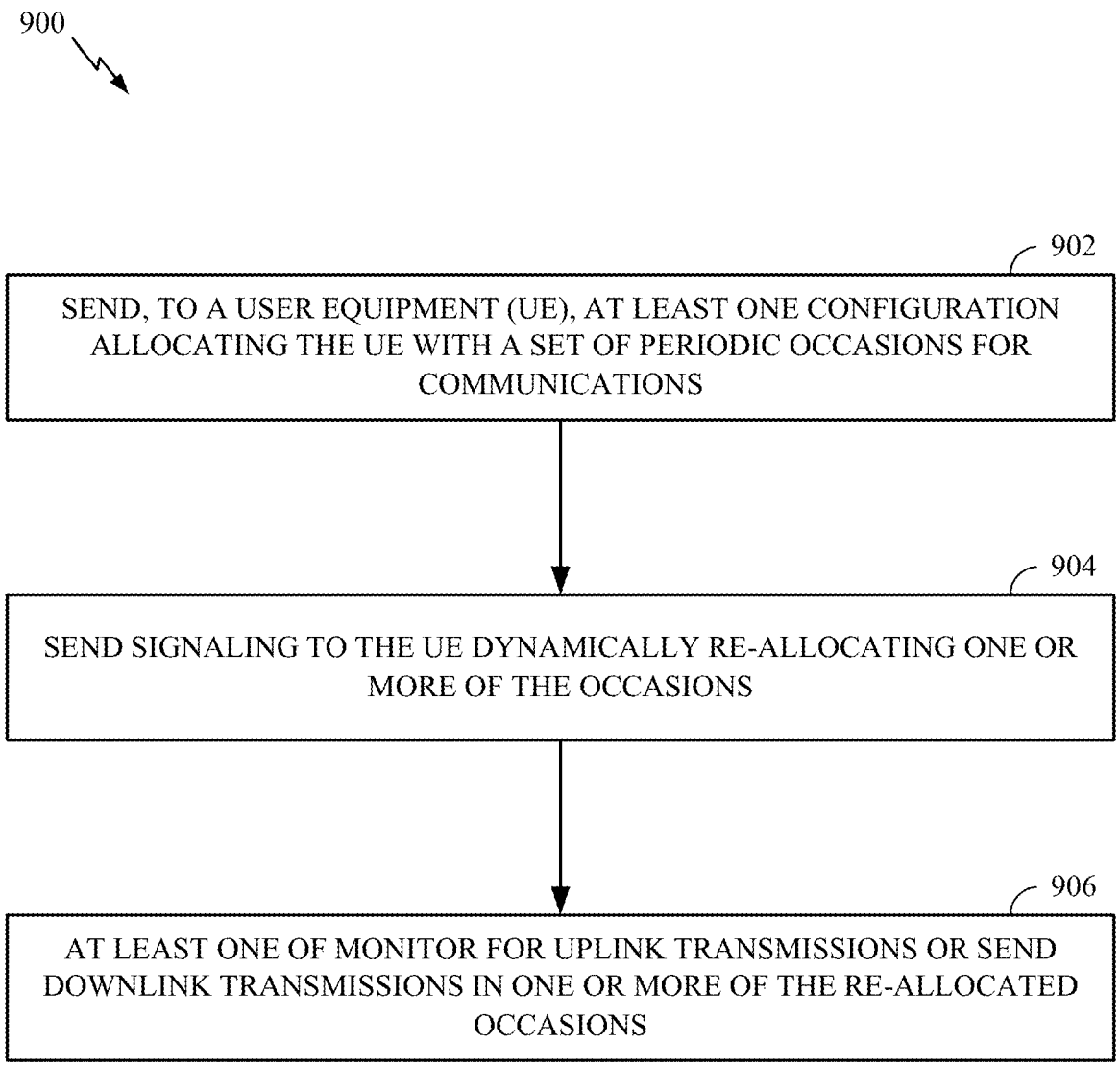
FIG. 9 illustrates example operations that may be performed by a network entity, in accordance with aspects of the present disclosure.

FIG. 9 illustrates example operations 900 that may be performed by a network entity and may be considered complementary to operations 800 of FIG. 8. For example, operations 900 may be performed by a gNB to re-allocate SPS/CG occasions for a UE (e.g., a UE performing operations 800 of FIG. 8).

Operations 900 begin, at 902, by sending, to a user equipment (UE), at least one configuration allocating the UE with a set of periodic occasions for communications.

At 904, the network entity sends signaling to the UE dynamically re-allocating one or more of the occasions.

At 906, the network entity performs at least one of monitoring for uplink transmissions or sending downlink transmissions in one or more of the re-allocated occasions.

Operations 800 and 900 of FIGS. 8 and 9 may be understood with reference to various dynamic SPS/CG re-allocation proposals shown in FIGS. 10-13.

In some cases, one or more specific SPS or CG occasions can be dynamically re-allocated, for example, using DCI or MAC-CE. The re-allocation may involve advancing one or more of the occasions in time, delaying one or more of the occasions in time, or moving the occasion to a different component carrier.

Figure 10:
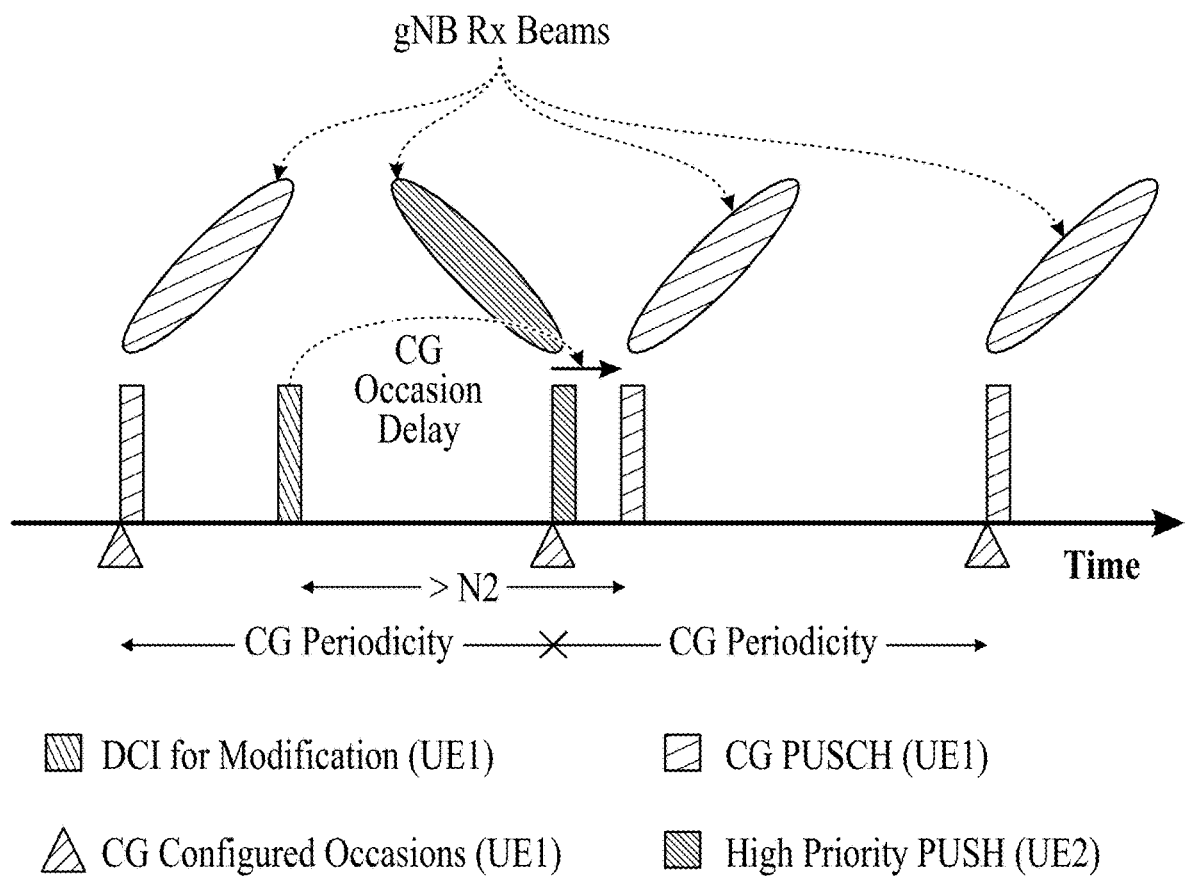
FIGS. 10-13 illustrate examples of dynamic reallocation of periodic occasions, in accordance with certain aspects of the present disclosure.

FIG. 10 illustrates an example where a CG occasion for one UE is delayed to accommodate a high priority transmission from another UE. In the illustrated example, a DCI is used to signal a delay of a CG occasion for UE1 in order to accommodate a high priority PUSCH transmission from UE2.

In the illustrated example, only one of UE1's CGs is delayed, as the following UE1 CG resumes at its normal periodicity. In general, however, the dynamic re-allocation may apply to move (in time or frequency) one or more upcoming consecutive or non-consecutive (e.g., based on some pattern) SPS or CG occasions. In some cases, the re-allocation may apply for all upcoming SPS or CG occasions until another DCI is received. This DCI could signal the UE should revert back to before the re-allocation or could signals another dynamic re-allocation.

The SPS or CG occasion(s) re-allocation could apply per UE (e.g., via UE-specific signaling) or could apply for multiple UEs (e.g., using a group-common DCI). If the re-allocation applies to a group of UEs, different advance, delay, or CCs may be applied per UE in the group.

In some cases, the SPS or CG occasion(s) re-allocation may be based on a UE recommended request. In such cases, the UE may indicate a requested re-allocation and the gNB may respond with signaling indicating the requested re-allocation or some other re-allocation.

In some cases, SPS or CG repetition may be enabled, (e.g., where multiple repetitions of PDSCH are sent in an SPS occasion or multiple repetitions of a PUSCH are sent in a CG occasion). If dynamic re-allocation is signaled in such cases, there are various options for applying the re-allocation.

According to a first option, the re-allocation may be applied to the 1$^{st}$ symbol/slot of the SPS or CG occasion. For example, in such cases, the whole repetition (all repetitions) may be advanced, delayed, or moved to another CC.

Figure 11:
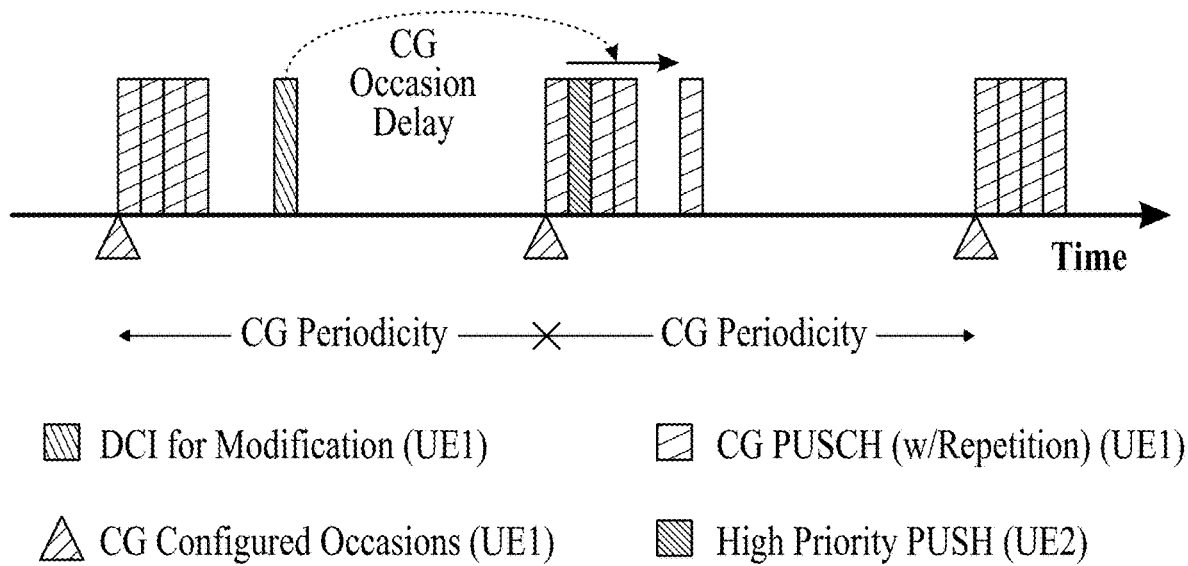

According to a second option, as illustrated in FIG. 11, the re-allocation may be applied to one or more specific repetitions. In the example shown in FIG. 11, a second of four CG repetitions is delayed, again to accommodate a high priority PUSCH transmission from UE2. As illustrated in the figure, for the subsequent CG occasion, the normal repetition timing may apply.

In cases where the timing is adjusted/shifted, the advance or delay can be in units of slots and/or symbols. In some cases, there may be restrictions on the shift. According to one option (Option A), the value of advance or delay may be any value less than the periodicity of the SPS or CG configuration. In this case, there may be special handling of HARQ process ID. According to another option (Option B), the value of advance or delay may be any value such that the calculated HARQ process ID does not change due to the advance/delay (which may avoid the special handling of HARQ process ID mentioned above).

In some cases, if the new location of the changed SPS or CG occasion is less than a specified minimum time from the DCI/MAC-CE that requested this change, the UE may ignore this request and use the original location. This may be necessary in cases to allow the UE may need some minimum amount of processing time. In some cases, this minimum time may be specified (in a standard), signaled, or based on UE capability.

In some cases, for CG, the configuredGrantTimer (for a corresponding HARQ process) may be started from the new location of the advanced or delayed occasion.

Figure 12:
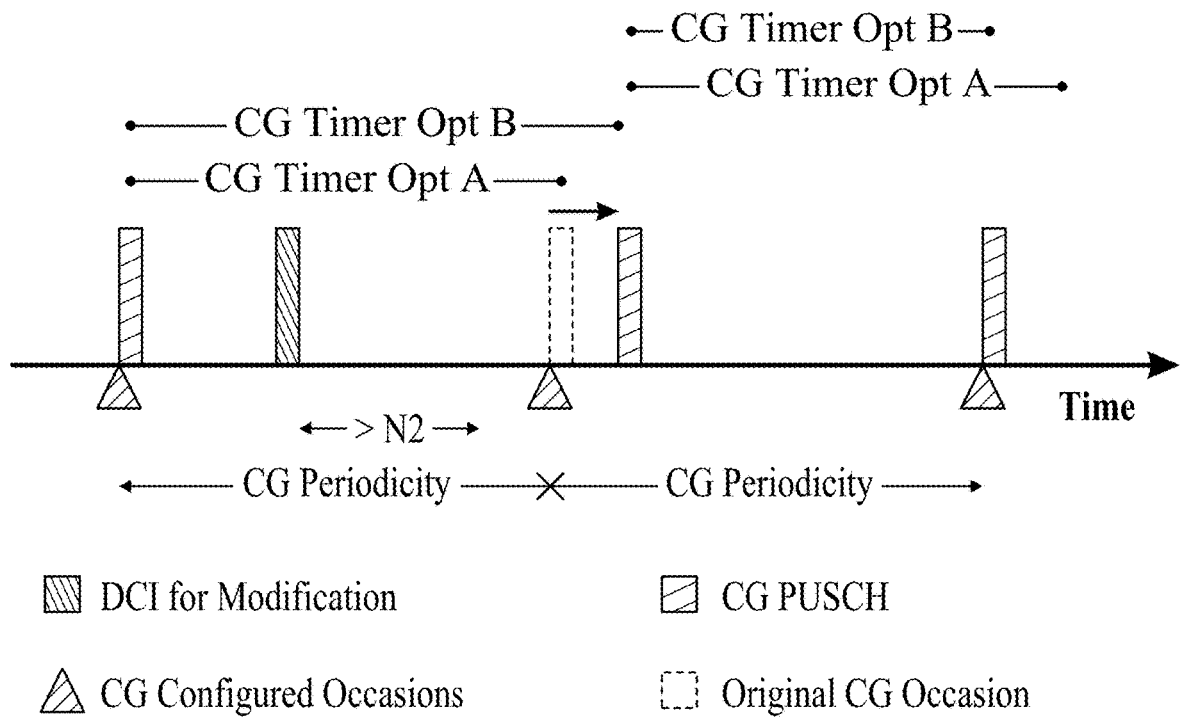

As illustrated in FIG. 12, there may be various options for adjusting a currently running timer. According to a first option, labeled Option A in FIG. 12, the (current) timer value may be left unchanged. According to another option, labeled Option B in FIG. 12, the timer value may be extended or shortened by the same value that the corresponding CG occasion is advanced or delayed, respectively.

In some cases for CG, if at the time the advanced or delayed CG occasion occurs, the configuredGrantTimer that was started on a previous CG occasion is still running, there are similar options to those described above. For example, according to one option, the timer value is unchanged and, according to another option, the timer value is shortened or extended by the same value that the corresponding CG occasion is advanced or delayed, respectively.

In either of the cases described above, where the timer is adjusted, if multiple occasions are advanced or delayed, the adjustment may be made to only the first of the multiple occasions.

In case of restriction in the value of an advance or delay described above, one option for HARQ Process ID handling (for Option A described above) is to use the same HARQ Process ID for the advanced or delayed SPS or CG occasion as that of the original SPS or CG occasion (before advancing or delaying). According to this option (Option A), the CURRENT_slot or CURRENT_symbol parameters in the equations may refer to the original SPS or CG occasion, respectively.

Figure 13:
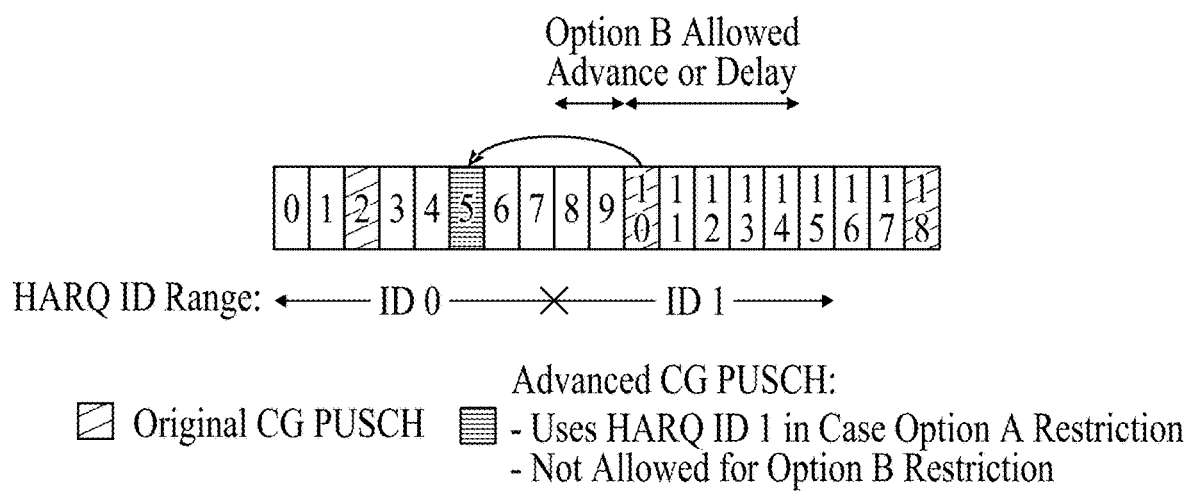

FIG. 13 illustrates an example timing advance of a CG occasion by 5 slots (from slot 10 to slot 5). As illustrated, this advancement would be allowed if using Option A, but HARQ ID 1 would be used.

In case of restriction referred to as option B, which is illustrated in FIG. 13, the value of the time adjustment is limited to any value such that the calculated HARQ process ID does not change due to the advance/delay. FIG. 13 illustrates how this option restricts the amount of advance (to 2 slots) and any further advance would not be allowed (as the HARQ Process ID would change from ID 1 to ID 0). Thus, the illustrated advancement of 5 slots, is not allowed. In the illustrated example, the limit for a delay, on the other hand, is 4 slots (due to the range of HARQ Process ID 1).

Figure 14:
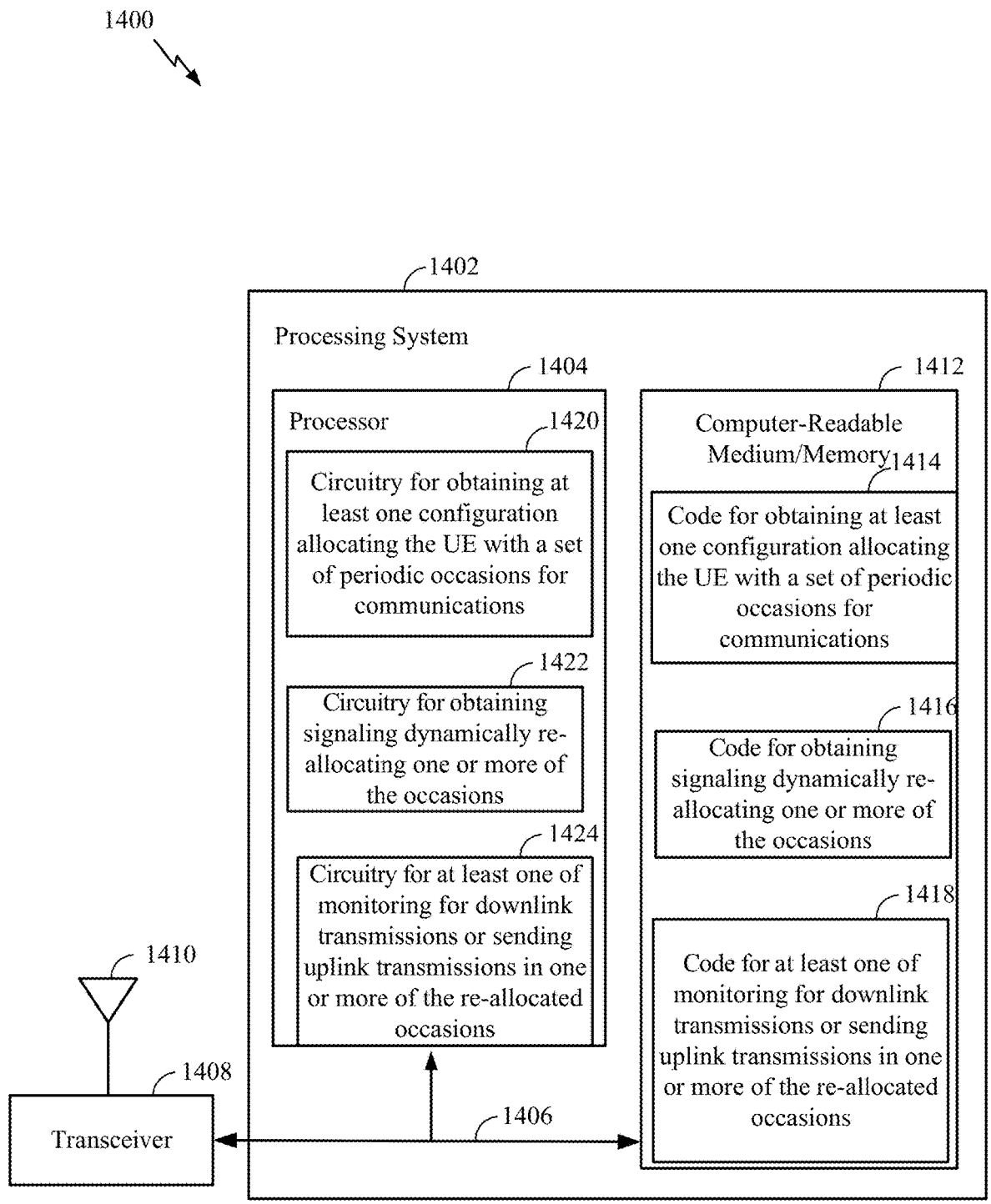
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 8. The communications device 1400 includes a processing system 1402 coupled to a transceiver 1408. The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 8, or other operations for performing the various techniques discussed herein. In certain aspects, computer-readable medium/memory 1412 stores code 1414 for obtaining at least one configuration allocating the UE with a set of periodic occasions for communications; code 1416 for obtaining signaling dynamically re-allocating one or more of the occasions; and code 1418 for at least one of monitoring for downlink transmissions or sending uplink transmissions in one or more of the re-allocated occasions. In certain aspects, the processor 1404 has circuitry configured to implement the code stored in the computer-readable medium/memory 1412. The processor 1404 includes circuitry 1420 for obtaining at least one configuration allocating the UE with a set of periodic occasions for communications; circuitry 1422 for obtaining signaling dynamically re-allocating one or more of the occasions; and circuitry 1424 for at least one of monitoring for downlink transmissions or sending uplink transmissions in one or more of the re-allocated occasions.

Figure 15:
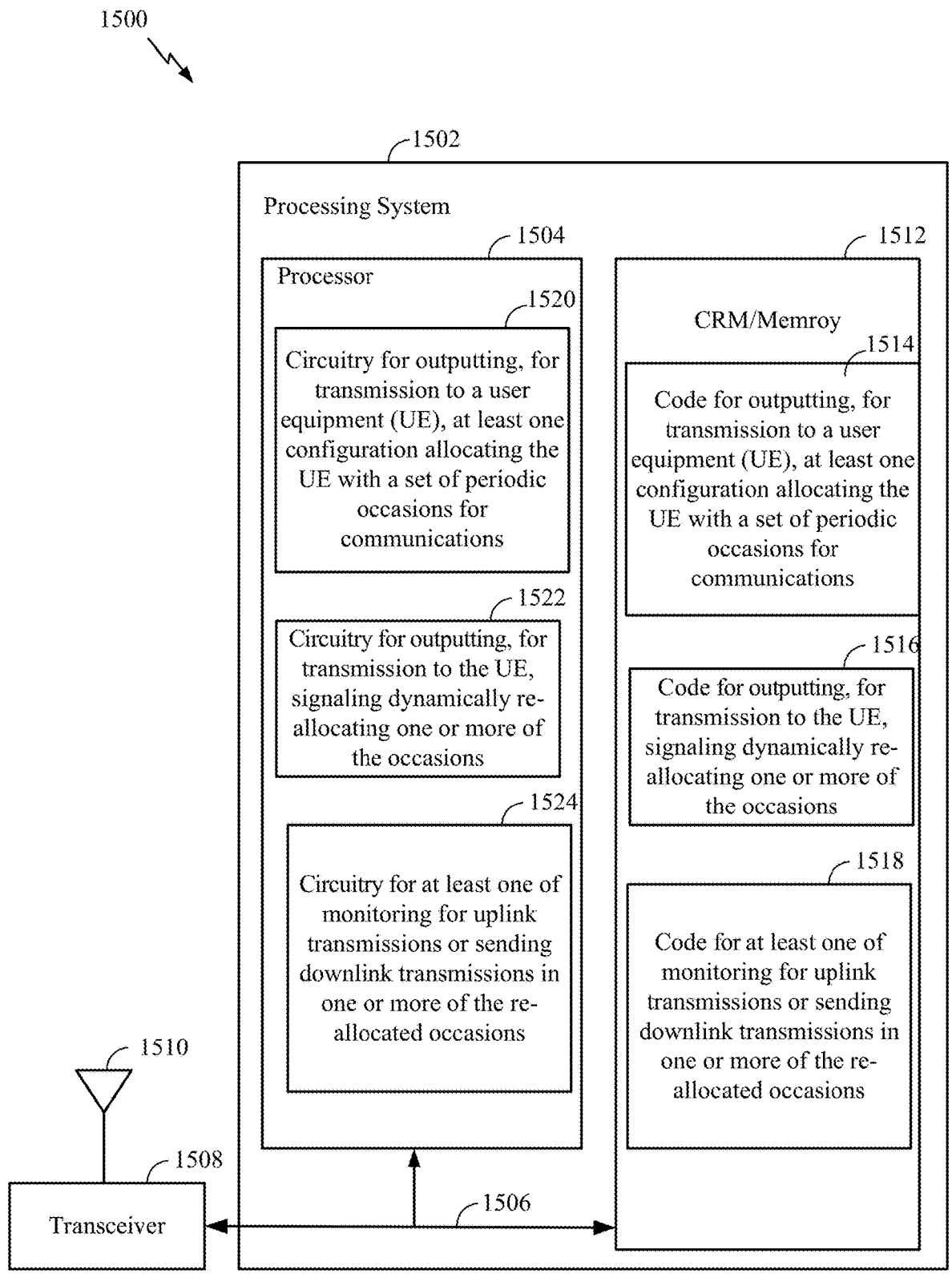
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 9. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1515 via a bus 1506. In certain aspects, the computer-readable medium/memory 1515 is configured to store instructions (e.g., computer-executable code) that when executed by the processor 1504, cause the processor 1504 to perform the operations illustrated in FIG. 9, or other operations for performing the various techniques discussed herein. In certain aspects, computer-readable medium/memory 1515 stores code 1514 for outputting, for transmission to the UE, at least one configuration allocating the UE with a set of periodic occasions for communications; code 1516 for outputting, for transmission to the UE, signaling dynamically re-allocating one or more of the occasions; and code 1518 for at least one of monitoring for uplink transmissions or sending downlink transmissions in one or more of the re-allocated occasions. In certain aspects, the processor 1504 has circuitry configured to implement the code stored in the computer-readable medium/memory 1515. The processor 1504 includes circuitry 1520 for outputting, for transmission to the UE, at least one configuration allocating the UE with a set of periodic occasions for communications; circuitry 1522 for outputting, for transmission to the UE, signaling dynamically re-allocating one or more of the occasions; and circuitry 1524 for at least one of monitoring for uplink transmissions or sending downlink transmissions in one or more of the re-allocated occasions.

In addition to the various aspects described above, aspects of specific combinations are within the scope of the disclosure, some of which are detailed below:

Aspect 1: A method for wireless communications by a user equipment (UE), comprising: receiving at least one configuration allocating the UE with a set of periodic occasions for communications; receiving signaling dynamically re-allocating one or more of the occasions; and at least one of monitoring for downlink transmissions or sending uplink transmissions in one or more of the re-allocated occasions.

Aspect 2: The method of Aspect 1, wherein the signaling comprises at least one of a downlink control information (DCI) or medium access control (MAC) control element (CE).

Aspect 3: The method of any one of Aspects 1-2, wherein the at least one configuration comprises a configuration for at least one of: semi-persistent scheduled (SPS) occasions for downlink transmissions; or configured grant (CG) occasions for uplink transmissions.

Aspect 4: The method of Aspect 3, wherein, if SPS or CG repetition is enabled, the re-allocation is applied: beginning with a first symbol or slot of an occasion such that the re-allocation applies to all repetitions of that occasion; or to one or more specific repetitions.

Aspect 5: The method of any one of Aspects 1-4, wherein the re-allocation comprises at least one of: advancing or delaying the occasions in time; or moving the occasions to a different component carrier (CC).

Aspect 6: The method of Aspect 5, wherein the advance or delay is in units of at least one of slots or symbols.

Aspect 7: The method of Aspect 5, wherein, if the occasions are for a configured grant (CG), a configured grant timer is started from a new location of the advanced or delayed occasion.

Aspect 8: The method of Aspect 7, wherein, when started from the new location: the timer value is unchanged; or the timer value is extended or shortened by a value that the corresponding CG occasion is advanced or delayed.

Aspect 9: The method of Aspect 5, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 10. The method of any of Aspects 9, wherein the timer value is shortened or extended only for the CG occasion that was changed.

Aspect 11: The method of Aspect 10, wherein, if multiple consecutive occasions were advanced or delayed, only the timer value is shortened or extended for only the first of the multiple consecutive occasions.

Aspect 12: The method of any one of Aspects 1-11, wherein the re-allocation applies to: one or more consecutive or non-consecutive upcoming occasions; or all upcoming occasions until another DCI is received.

Aspect 13: The method of any one of Aspects 1-12, wherein: the signaling is specific to the UE; or the signaling is for a group of UEs via a group-common downlink control information (DCI).

Aspect 14: The method of Aspect 13, wherein the group-common DCI is capable of indicating different re-allocation for UEs in the group.

Aspect 15: The method of Aspect 5, wherein the advance or delay is less than the periodicity of the occasions.

Aspect 16: The method of Aspect 15, comprising: using a same hybrid automatic repeat request (HARQ) process ID for the advanced or delayed occasion as that of the original occasion before advancing or delaying.

Aspect 17: The method of Aspect 5, wherein the advance or delay is allowed to be any value that maintains a calculated hybrid automatic repeat request (HARQ) process ID.

Aspect 18: The method of Aspect 17, comprising: calculating the hybrid automatic repeat request (HARM) process ID for the advanced or delayed occasion based on a current slot or current symbol of the advanced or delayed occasion.

Aspect 19: The method of any one of Aspects 1-18, further comprising: sending a request indicating a recommended re-allocation, wherein the signaling is received in response to the request.

Aspect 20: The method of any one of Aspects 1-19, wherein, if a location of a re-allocated occasion is less than or equal to a minimum time from the signaling, the UE is allowed to ignore the reallocation.

Aspect 21: The method of Aspect 20, wherein the minimum time is specified, signaled, or based on UE capability.

Aspect 22: A method for wireless communications by a network entity, comprising: sending, to a user equipment (UE), at least one configuration allocating the UE with a set of periodic occasions for communications; sending signaling to the UE dynamically re-allocating one or more of the occasions; and at least one of monitoring for uplink transmissions or sending downlink transmissions in one or more of the re-allocated occasions.

Aspect 23: The method of Aspect 22, wherein the signaling comprises at least one of a downlink control information (DCI) or medium access control (MAC) control element (CE).

Aspect 24: The method of any one of Aspects 22-23, wherein the at least one configuration comprises a configuration for at least one of: semi-persistent scheduled (SPS) occasions for downlink transmissions; or configured grant (CG) occasions for uplink transmissions.

Aspect 25: The method of Aspect 24, wherein, if SPS or CG repetition is enabled, the re-allocation is applied: beginning with a first symbol or slot of an occasion such that the re-allocation applies to all repetitions of that occasion; or to one or more specific repetitions.

Aspect 26: The method of any one of Aspects 22-25, wherein the re-allocation comprises at least one of: advancing or delaying the occasions in time; or moving the occasions to a different component carrier (CC).

Aspect 27: The method of Aspect 26, wherein the advance or delay is in units of at least one of slots or symbols.

Aspect 28: The method of Aspect 26, wherein, if the occasions are for a configured grant (CG), a configured grant timer is started from a new location of the advanced or delayed occasion.

Aspect 29: The method of Aspect 28, wherein, when started from the new location: the timer value is unchanged; or the timer value is extended or shortened by a value that the corresponding CG occasion is advanced or delayed.

Aspect 30: The method of Aspect 26, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 31: The method of any of Aspects 30, wherein the timer value is shortened or extended only for the CG occasion that was changed.

Aspect 32: The method of Aspect 31, wherein, if multiple consecutive occasions were advanced or delayed, only the timer value is shortened or extended for only the first of the multiple consecutive occasions.

Aspect 33: The method of any one of Aspects 22-32, wherein the re-allocation applies to: one or more consecutive or non-consecutive upcoming occasions; or all upcoming occasions until another DCI is received.

Aspect 34: The method of any one of Aspects 22-33, wherein: the signaling is specific to the UE; or the signaling is for a group of UEs via a group-common downlink control information (DCI).

Aspect 35: The method of Aspect 34, wherein the group-common DCI is capable of indicating different re-allocation for UEs in the group.

Aspect 36: The method of Aspect 26, wherein the advance or delay is less than the periodicity of the occasions.

Aspect 37: The method of Aspect 36, comprising: using a same hybrid automatic repeat request (HARQ) process ID for the advanced or delayed occasion as that of the original occasion before advancing or delaying.

Aspect 38: The method of Aspect 26, wherein the advance or delay is allowed to be any value that maintains a calculated hybrid automatic repeat request (HARQ) process ID.

Aspect 39: The method of Aspect 38, comprising: calculating the hybrid automatic repeat request (HARM) process ID for the advanced or delayed occasion based on a current slot or current symbol of the advanced or delayed occasion.

Aspect 40: The method of any one of Aspects 22-39, further comprising: receiving a request indicating a recommended re-allocation, wherein: the signaling is received in response to the request.

Aspect 41: The method of any one of Aspects 22-40, wherein, if a location of a re-allocated occasion is less than or equal to a minimum time from the signaling, the UE is allowed to ignore the reallocation.

Aspect 42: The method of Aspect 41, wherein the minimum time is specified, signaled, or based on UE capability.

Aspect 43: A user equipment (UE), comprising: means for receiving at least one configuration allocating the UE with a set of periodic occasions for communications; means for receiving signaling dynamically re-allocating one or more of the occasions; and at least one of means for monitoring for downlink transmissions or means for sending uplink transmissions in one or more of the re-allocated occasions.

Aspect 44: The UE of Aspect 43, wherein the signaling comprises at least one of a downlink control information (DCI) or medium access control (MAC) control element (CE).

Aspect 45: The UE of any one of Aspects 43-44, wherein the at least one configuration comprises a configuration for at least one of: semi-persistent scheduled (SPS) occasions for downlink transmissions; or configured grant (CG) occasions for uplink transmissions.

Aspect 46: The UE of Aspect 45, wherein, if SPS or CG repetition is enabled, the re-allocation is applied: beginning with a first symbol or slot of an occasion such that the re-allocation applies to all repetitions of that occasion; or to one or more specific repetitions.

Aspect 47: The UE of any one of Aspects 43-46, wherein the re-allocation comprises at least one of: advancing or delaying the occasions in time; or moving the occasions to a different component carrier (CC).

Aspect 48: The UE of Aspect 47, wherein the advance or delay is in units of at least one of slots or symbols.

Aspect 49: The UE of Aspect 47, wherein, if the occasions are for a configured grant (CG), a configured grant timer is started from a new location of the advanced or delayed occasion.

Aspect 50: The UE of Aspect 49, wherein, when started from the new location: the timer value is unchanged; or the timer value is extended or shortened by a value that the corresponding CG occasion is advanced or delayed.

Aspect 51: The UE of Aspect 47, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 52: The UE of any of Aspects 51, wherein the timer value is shortened or extended only for the CG occasion that was changed.

Aspect 53: The UE of Aspect 52, wherein, if multiple consecutive occasions were advanced or delayed, only the timer value is shortened or extended for only the first of the multiple consecutive occasions.

Aspect 54: The UE of any one of Aspects 43-53, wherein the re-allocation applies to: one or more consecutive or non-consecutive upcoming occasions; or all upcoming occasions until another DCI is received.

Aspect 55: The UE of any one of Aspects 43-54, wherein: the signaling is specific to the UE; or the signaling is for a group of UEs via a group-common downlink control information (DCI).

Aspect 56: The UE of Aspect 55, wherein the group-common DCI is capable of indicating different re-allocation for UEs in the group.

Aspect 57: The UE of Aspect 47, wherein the advance or delay is less than the periodicity of the occasions.

Aspect 58: The UE of Aspect 57, comprising: means for using a same hybrid automatic repeat request (HARQ) process ID for the advanced or delayed occasion as that of the original occasion before advancing or delaying.

Aspect 59: The UE of Aspect 47, wherein the advance or delay is allowed to be any value that maintains a calculated hybrid automatic repeat request (HARQ) process ID.

Aspect 60: The UE of Aspect 59, comprising: means for calculating the hybrid automatic repeat request (HARM) process ID for the advanced or delayed occasion based on a current slot or current symbol of the advanced or delayed occasion.

Aspect 61: The UE of any one of Aspects 43-60, further comprising: means for sending a request indicating a recommended re-allocation, wherein the signaling is received in response to the request.

Aspect 62: The UE of any one of Aspects 43-61, wherein, if a location of a re-allocated occasion is less than or equal to a minimum time from the signaling, the UE is allowed to ignore the reallocation.

Aspect 63: The UE of Aspect 62, wherein the minimum time is specified, signaled, or based on UE capability.

Aspect 64: A network entity, comprising: means for sending, to a user equipment (UE), at least one configuration allocating the UE with a set of periodic occasions for communications; means for sending signaling to the UE dynamically re-allocating one or more of the occasions; and at least one of means for monitoring for uplink transmissions or means for sending downlink transmissions in one or more of the re-allocated occasions.

Aspect 65: The network entity of Aspect 64, wherein the signaling comprises at least one of a downlink control information (DCI) or medium access control (MAC) control element (CE).

Aspect 66: The network entity of any one of Aspects 64-65, wherein the at least one configuration comprises a configuration for at least one of: semi-persistent scheduled (SPS) occasions for downlink transmissions; or configured grant (CG) occasions for uplink transmissions.

Aspect 67: The network entity of Aspect 66, wherein, if SPS or CG repetition is enabled, the re-allocation is applied: beginning with a first symbol or slot of an occasion such that the re-allocation applies to all repetitions of that occasion; or to one or more specific repetitions.

Aspect 68: The network entity of any one of Aspects 64-67, wherein the re-allocation comprises at least one of: advancing or delaying the occasions in time; or moving the occasions to a different component carrier (CC).

Aspect 69: The network entity of Aspect 68, wherein the advance or delay is in units of at least one of slots or symbols.

Aspect 70: The network entity of Aspect 68, wherein, if the occasions are for a configured grant (CG), a configured grant timer is started from a new location of the advanced or delayed occasion.

Aspect 71: The network entity of Aspect 70, wherein, when started from the new location: the timer value is unchanged; or the timer value is extended or shortened by a value that the corresponding CG occasion is advanced or delayed.

Aspect 72: The network entity of Aspect 68, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 73: The network entity of any of Aspects 72, wherein the timer value is shortened or extended only for the CG occasion that was changed.

Aspect 74: The network entity of Aspect 73, wherein, if multiple consecutive occasions were advanced or delayed, only the timer value is shortened or extended for only the first of the multiple consecutive occasions.

Aspect 75: The network entity of any one of Aspects 64-74, wherein the re-allocation applies to: one or more consecutive or non-consecutive upcoming occasions; or all upcoming occasions until another DCI is received.

Aspect 76: The network entity of any one of Aspects 64-75, wherein: the signaling is specific to the UE; or the signaling is for a group of UEs via a group-common downlink control information (DCI).

Aspect 77: The network entity of Aspect 76, wherein the group-common DCI is capable of indicating different re-allocation for UEs in the group.

Aspect 78: The network entity of Aspect 68, wherein the advance or delay is less than the periodicity of the occasions.

Aspect 79: The network entity of Aspect 78, comprising: means for using a same hybrid automatic repeat request (HARQ) process ID for the advanced or delayed occasion as that of the original occasion before advancing or delaying.

Aspect 80: The network entity of Aspect 68, wherein the advance or delay is allowed to be any value that maintains a calculated hybrid automatic repeat request (HARQ) process ID.

Aspect 81: The network entity of Aspect 80, comprising: means for calculating the hybrid automatic repeat request (HARQ) process ID for the advanced or delayed occasion based on a current slot or current symbol of the advanced or delayed occasion.

Aspect 82: The network entity of any one of Aspects 64-81, further comprising: means for receiving a request indicating a recommended re-allocation, wherein: the signaling is received in response to the request.

Aspect 83: The network entity of any one of Aspects 64-82, wherein, if a location of a re-allocated occasion is less than or equal to a minimum time from the signaling, the UE is allowed to ignore the reallocation.

Aspect 84: The network entity of Aspect 83, wherein the minimum time is specified, signaled, or based on UE capability.

Aspect 85: A user equipment (UE), comprising: a receiver configured to receive at least one configuration allocating the UE with a set of periodic occasions for communications and signaling dynamically re-allocating one or more of the occasions; and a processing system configured to at least one of monitor for downlink transmissions or provide uplink transmissions, for transmission, in one or more of the re-allocated occasions.

Aspect 86: The UE of Aspect 85, wherein the signaling comprises at least one of a downlink control information (DCI) or medium access control (MAC) control element (CE).

Aspect 87: The UE of any one of Aspects 85-86, wherein the at least one configuration comprises a configuration for at least one of: semi-persistent scheduled (SPS) occasions for downlink transmissions; or configured grant (CG) occasions for uplink transmissions.

Aspect 88: The UE of Aspect 87, wherein, if SPS or CG repetition is enabled, the re-allocation is applied: beginning with a first symbol or slot of an occasion such that the re-allocation applies to all repetitions of that occasion; or to one or more specific repetitions.

Aspect 89: The UE of any one of Aspects 85-88, wherein the re-allocation comprises at least one of: advancing or delaying the occasions in time; or moving the occasions to a different component carrier (CC).

Aspect 90: The UE of Aspect 89, wherein the advance or delay is in units of at least one of slots or symbols.

Aspect 91: The UE of Aspect 89, wherein, if the occasions are for a configured grant (CG), a configured grant timer is started from a new location of the advanced or delayed occasion.

Aspect 92: The UE of Aspect 91, wherein, when started from the new location: the timer value is unchanged; or the timer value is extended or shortened by a value that the corresponding CG occasion is advanced or delayed.

Aspect 93: The UE of Aspect 89, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 94: The UE of any of Aspects 93, wherein the timer value is shortened or extended only for the CG occasion that was changed.

Aspect 95: The UE of Aspect 94, wherein, if multiple consecutive occasions were advanced or delayed, only the timer value is shortened or extended for only the first of the multiple consecutive occasions.

Aspect 96: The UE of any one of Aspects 85-95, wherein the re-allocation applies to: one or more consecutive or non-consecutive upcoming occasions; or all upcoming occasions until another DCI is received.

Aspect 97: The UE of any one of Aspects 85-96, wherein: the signaling is specific to the UE; or the signaling is for a group of UEs via a group-common downlink control information (DCI).

Aspect 98: The UE of Aspect 97, wherein the group-common DCI is capable of indicating different re-allocation for UEs in the group.

Aspect 99: The UE of Aspect 89, wherein the advance or delay is less than the periodicity of the occasions.

Aspect 100: The UE of Aspect 99, wherein the processing system is further configured to: use a same hybrid automatic repeat request (HARQ) process ID for the advanced or delayed occasion as that of the original occasion before advancing or delaying.

Aspect 101: The UE of Aspect 89, wherein the advance or delay is allowed to be any value that maintains a calculated hybrid automatic repeat request (HARQ) process ID.

Aspect 102: The UE of Aspect 101, wherein the processing system is further configured to: calculate the hybrid automatic repeat request (HARM) process ID for the advanced or delayed occasion based on a current slot or current symbol of the advanced or delayed occasion.

Aspect 103: The UE of any one of Aspects 85-102, wherein: the processing system is further configured to provide a request, for transmission, indicating a recommended re-allocation; and the signaling is received in response to the request.

Aspect 104: The UE of any one of Aspects 85-103, wherein, if a location of a re-allocated occasion is less than or equal to a minimum time from the signaling, the UE is allowed to ignore the reallocation.

Aspect 105: The UE of Aspect 104, wherein the minimum time is specified, signaled, or based on UE capability.

Aspect 106: A network entity, comprising: a transmitter configured to send, to a user equipment (UE), at least one configuration allocating the UE with a set of periodic occasions for communications and send signaling to the UE dynamically re-allocating one or more of the occasions; and a processing system configured to at least one of monitor for uplink transmissions or provide downlink transmissions, for transmission, in one or more of the re-allocated occasions.

Aspect 107: The network entity of Aspect 106, wherein the signaling comprises at least one of a downlink control information (DCI) or medium access control (MAC) control element (CE).

Aspect 108: The network entity of any one of Aspects 106-107, wherein the at least one configuration comprises a configuration for at least one of: semi-persistent scheduled (SPS) occasions for downlink transmissions; or configured grant (CG) occasions for uplink transmissions.

Aspect 109: The network entity of Aspect 108, wherein, if SPS or CG repetition is enabled, the re-allocation is applied: beginning with a first symbol or slot of an occasion such that the re-allocation applies to all repetitions of that occasion; or to one or more specific repetitions.

Aspect 110: The network entity of any one of Aspects 106-109, wherein the re-allocation comprises at least one of: advancing or delaying the occasions in time; or moving the occasions to a different component carrier (CC).

Aspect 111: The network entity of Aspect 110, wherein the advance or delay is in units of at least one of slots or symbols.

Aspect 112: The network entity of Aspect 110, wherein, if the occasions are for a configured grant (CG), a configured grant timer is started from a new location of the advanced or delayed occasion.

Aspect 113: The network entity of Aspect 112, wherein, when started from the new location: the timer value is unchanged; or the timer value is extended or shortened by a value that the corresponding CG occasion is advanced or delayed.

Aspect 114: The network entity of Aspect 110, wherein, if the occasions are for a configured grant (CG) and if, at the time the advanced or delayed CG occasion occurs, a configured grant timer is still running that was started on a previous CG occasion: the UE does not change the timer value; or the UE shortens or extends the timer value by a same value that the corresponding CG occasion is advanced or delayed.

Aspect 115: The network entity of any of Aspects 114, wherein the timer value is shortened or extended only for the CG occasion that was changed.

Aspect 116: The network entity of Aspect 115, wherein, if multiple consecutive occasions were advanced or delayed, only the timer value is shortened or extended for only the first of the multiple consecutive occasions.

Aspect 117: The network entity of any one of Aspects 106-116, wherein the re-allocation applies to: one or more consecutive or non-consecutive upcoming occasions; or all upcoming occasions until another DCI is received.

Aspect 118: The network entity of any one of Aspects 106-117, wherein: the signaling is specific to the UE; or the signaling is for a group of UEs via a group-common downlink control information (DCI).

Aspect 119: The network entity of Aspect 118, wherein the group-common DCI is capable of indicating different re-allocation for UEs in the group.

Aspect 120: The network entity of Aspect 110, wherein the advance or delay is less than the periodicity of the occasions.

Aspect 121: The network entity of Aspect 120, wherein the processing systems is further configured to: use a same hybrid automatic repeat request (HARQ) process ID for the advanced or delayed occasion as that of the original occasion before advancing or delaying.

Aspect 122: The network entity of Aspect 110, wherein the advance or delay is allowed to be any value that maintains a calculated hybrid automatic repeat request (HARQ) process ID.

Aspect 123: The network entity of Aspect 122, wherein the processing systems is further configured to: calculate the hybrid automatic repeat request (HARQ) process ID for the advanced or delayed occasion based on a current slot or current symbol of the advanced or delayed occasion.

Aspect 124: The network entity of any one of Aspects 106-123, wherein: the processing systems is further configured to obtain a request indicating a recommended re-allocation; and the signaling is transmitted in response to the request.

Aspect 125: The network entity of any one of Aspects 106-124, wherein, if a location of a re-allocated occasion is less than or equal to a minimum time from the signaling, the UE is allowed to ignore the reallocation.

Aspect 126: The network entity of Aspect 125, wherein the minimum time is specified, signaled, or based on UE capability.

Aspect 127: An apparatus for wireless communications by a user equipment (UE), comprising a processing system configured to: obtain at least one configuration allocating the UE with a set of periodic occasions for communications; obtain signaling dynamically re-allocating one or more of the occasions; and at least one of monitor for downlink transmissions or provide uplink transmissions, for transmission, in one or more of the re-allocated occasions.

Aspect 128: An apparatus for wireless communications by a network entity, comprising a processing system configured to: output, for transmission to a user equipment (UE), at least one configuration allocating the UE with a set of periodic occasions for communications; output, for transmission to the UE, signaling dynamically re-allocating one or more of the occasions; and at least one of monitor for uplink transmissions or provide downlink transmissions, for transmission, in one or more of the re-allocated occasions.

Aspect 129: A computer-readable medium for wireless communications by a user equipment (UE), comprising instructions executable to: obtain at least one configuration allocating the UE with a set of periodic occasions for communications; obtain signaling dynamically re-allocating one or more of the occasions; and at least one of monitor for downlink transmissions or send uplink transmissions in one or more of the re-allocated occasions.

Aspect 130: A computer-readable medium for wireless communications by network entity (UE), comprising instructions executable to: output, for transmission to a user equipment (UE), at least one configuration allocating the UE with a set of periodic occasions for communications; output, for transmission to the UE, signaling dynamically re-allocating one or more of the occasions; and at least one of monitor for uplink transmissions or send downlink transmissions in one or more of the re-allocated occasions.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464 and 466, and/or controller/processor 480 of the UE 120 and/or processors 420, 430, 438, and/or controller/processor 440 of the BS 110 shown in FIG. 4 may be configured to perform operations 800 of FIG. 8 and/or operations 900 of FIG. 9.

Means for receiving may include a transceiver, a receiver or at least one antenna and at least one receive processor illustrated in FIG. 4. Means for transmitting, means for sending or means for outputting may include, a transceiver, a transmitter or at least one antenna and at least one transmit processor illustrated in FIG. 4. Means for using, means for calculating and means for monitoring may include a processing system, which may include one or more processors, such as processors 458, 464 and 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving at least one configuration allocating the UE with a set of periodic occasions for communications;
   receiving signaling dynamically re-allocating one or more of the occasions; and
   at least one of monitoring for downlink transmissions or sending uplink transmissions in one or more of the re-allocated occasions, wherein, if a location of a re-allocated occasion is less than or equal to a minimum time from the signaling, the UE is allowed to ignore the reallocation.

2. The method of claim 1, wherein the at least one configuration comprises a configuration for at least one of:
   semi-persistent scheduled (SPS) occasions for downlink transmissions; or
   configured grant (CG) occasions for uplink transmissions.

3. The method of claim 2, wherein, if SPS or CG repetition is enabled, the re-allocation is applied:
   beginning with a first symbol or slot of an occasion in order to apply the re-allocation to all repetitions of that occasion; or
   to one or more specific repetitions.

4. The method of claim 1, wherein the re-allocation comprises at least one of:
   advancing or delaying the occasions; or
   moving the occasions to a different component carrier (CC).

5. The method of claim 4, wherein, if the occasions are for a configured grant (CG), a configured grant timer is started from a new location of the advanced or delayed occasion.

6. The method of claim 5, wherein, when started from the new location:
   a value of the configured grant timer is unchanged; or
   a value of the configured grant timer is extended or shortened by a value that the corresponding CG occasion is advanced or delayed.

7. The method of claim 4, wherein, if the occasions are for a configured grant (CG) and if, at a time at which the advanced or delayed CG occasion occurs, a configured grant timer is still running that was started on a previous CG occasion:
   the UE does not change a value of the timer; or
   the UE shortens or extends a value of the timer by a same value that the corresponding CG occasion is advanced or delayed.

8. The method of claim 7, wherein the timer value is shortened or extended only for the CG occasion that was changed.

9. The method of claim 4, wherein the advance or delay is less than the periodicity of the occasions.

10. The method of claim 9, comprising:
    using a same hybrid automatic repeat request (HARQ) process ID for the advanced or delayed occasion as that of an original occasion before advancing or delaying.

11. The method of claim 4, wherein the advance or delay is allowed to be any value that maintains a calculated hybrid automatic repeat request (HARQ) process ID.

12. The method of claim 11, comprising:
calculating the hybrid automatic repeat request (HARQ) process ID for the advanced or delayed occasion based on a current slot or current symbol of the advanced or delayed occasion.

13. The method of claim 1, wherein:
the signaling is specific to the UE; or
the signaling is for a group of UEs via a group-common downlink control information (DCI).

14. The method of claim 13, wherein the group-common DCI indicates different re-allocation for UEs in the group.

15. An apparatus for wireless communications by a user equipment (UE), comprising:
a memory having executable instructions stored thereon; and
one or more processors configured to execute the executable instructions to cause the apparatus to:
receive at least one configuration allocating the UE with a set of periodic occasions for communications;
receive signaling dynamically re-allocating one or more of the occasions; and
at least one of monitor for downlink transmissions or send uplink transmissions in one or more of the re-allocated occasions, wherein, if a location of a re-allocated occasion is less than or equal to a minimum time from the signaling, the UE is allowed to ignore the reallocation.

16. The apparatus of claim 15, wherein the at least one configuration comprises a configuration for at least one of:
semi-persistent scheduled (SPS) occasions for downlink transmissions; or
configured grant (CG) occasions for uplink transmissions.

17. The apparatus of claim 16, wherein, if SPS or CG repetition is enabled, the one or more processors are configured to cause the apparatus to apply the re-allocation:
beginning with a first symbol or slot of an occasion in order to apply the re-allocation to all repetitions of that occasion; or
to one or more specific repetitions.

18. The apparatus of claim 15, wherein the one or more processors are configured to cause the system to apply the re-allocation by at least one of:
advancing or delaying the occasions; or
moving the occasions to a different component carrier (CC).

19. The apparatus of claim 18, wherein, if the occasions are for a configured grant (CG), the one or more processors are configured to cause the apparatus to start a configured grant timer from a new location of the advanced or delayed occasion.

20. The apparatus of claim 19, wherein, when started from the new location:
the one or more processors are configured to cause the apparatus to leave a value of the configured grant timer unchanged; or
the one or more processors are configured to cause the apparatus to extend or shorten a value of the configured grant timer by a value that the corresponding CG occasion is advanced or delayed.

21. The apparatus of claim 18, wherein, if the occasions are for a configured grant (CG) and if, at a time at which the advanced or delayed CG occasion occurs, a configured grant timer is still running that was started on a previous CG occasion:
the one or more processors are configured to cause the apparatus to not change a value of the timer; or
the one or more processors are configured to cause the apparatus to shorten or extend a value of the timer by a same value that the corresponding CG occasion is advanced or delayed.

22. The apparatus of claim 21, wherein the one or more processors are configured to cause the apparatus to shorten or extend the timer value only for the CG occasion that was changed.

23. The apparatus of claim 18, wherein the advance or delay is less than the periodicity of the occasions.

24. The apparatus of claim 23, wherein the one or more processors are further configured to cause the apparatus to:
use a same hybrid automatic repeat request (HARQ) process ID for the advanced or delayed occasion as that of an original occasion before advancing or delaying.

25. The apparatus of claim 18, wherein the advance or delay comprises any value that maintains a calculated hybrid automatic repeat request (HARQ) process ID.

26. The apparatus of claim 25, wherein the one or more processors are further configured to cause the apparatus to:
calculate the hybrid automatic repeat request (HARQ) process ID for the advanced or delayed occasion based on a current slot or current symbol of the advanced or delayed occasion.

27. The apparatus of claim 15, wherein:
the signaling is specific to the UE; or
the signaling is for a group of UEs via a group-common downlink control information (DCI).

28. The apparatus of claim 27, wherein the group-common DCI indicates different re-allocation for UEs in the group.

* * * * *